United States Patent [19]

Sandman

[11] Patent Number: 4,654,099

[45] Date of Patent: Mar. 31, 1987

[54] METHOD OF PRODUCTION OF A NON-SKID LAMINATED SHEET

[75] Inventor: Robert B. Sandman, Sheboygan, Wis.

[73] Assignee: The Vollrath Company, Sheboygan, Wis.

[21] Appl. No.: 773,444

[22] Filed: Sep. 6, 1985

[51] Int. Cl.[4] .......................... B32B 31/12; C09J 5/00
[52] U.S. Cl. ..................................... 156/220; 156/87;
156/224; 156/235; 156/249; 156/307.4;
156/309.6; 156/312; 156/323; 206/557;
264/344; 428/423.3; 428/425.3; 428/525;
428/531
[58] Field of Search ................. 156/87, 312, 220, 323,
156/249, 224, 307.4, 235, 309.6; 428/525, 531,
423.3, 425.3; 206/557; 264/344

[56] References Cited

U.S. PATENT DOCUMENTS 2,646,380  7/1953  Barlow .
3,677,876  7/1972  Oliver ................................ 156/323
3,698,978  10/1972  McQuade .
3,841,956  10/1974  Palazzolo et al. ................... 156/87
3,846,217  11/1974  Grosheim .
4,092,196  5/1978  Scher et al. .
4,093,766  6/1978  Scher et al. .
4,145,240  3/1979  Polzin ................................ 156/224
4,163,818  8/1979  Wernli .
4,343,850  8/1982  Kravig et al. .
4,412,883  11/1983  Rico .
4,515,852  5/1985  Katabe et al. .

Primary Examiner—John J. Gallagher
Attorney, Agent, or Firm—Dressler, Goldsmith, Shore, Sutker & Milnamow, Ltd.

[57] ABSTRACT

The present invention contemplates a method of manufacturing a laminated sheet having a non-skid surface. In a preferred embodiment a method of manufacturing a decorated unitary laminated tray having a thermoplastic non-skid layer is disclosed.

13 Claims, No Drawings

METHOD OF PRODUCTION OF A NON-SKID LAMINATED SHEET

DESCRIPTION

1. Technical Field

The present invention relates to a method of manufacturing a laminated sheet having a non-skid surface.

2. Background

Laminated sheets prepared by fusing a plurality of thermoset resin-impregnated webs in a mold under conditions of elevated temperature and pressure are well-known in the art. For example, thermosetting resin-impregnated laminates are described in U.S. Pat. Nos. 2,646,380, 3,698,978, 4,093,766 and 4,343,850, which are incorporated herein by reference. Such laminates are useful as countertops, cabinet surfaces and serving trays.

Non-skid surfaces on laminates such as serving trays are frequently manufactured by affixing a cork layer, a synthetic rubber sheet or the like to the upper surface of the laminate using a layer of an adhesive material. Such trays are frequently used commercially and can be subjected to repeated high temperature washing. Repeated washing can affect the adhesive layer and thereby interfere with the attachment of the non-skid layer to the tray.

In other applications, such as countertops, when a conventional laminated sheet having an adhesive-bonded non-skid surface is cut, the layers are more likely to separate or produce an uneven edge than if a unitary laminate were used. Unitary laminates in which the non-skid surface becomes an integral part of the laminate during the manufacturing process are therefore advantageous.

During the resin fusing or curing process, gas is released from the thermosetting resin-impregnated webs. Where a thermoplastic material is utilized to form a non-skid surface on a laminate, the released gas forms a layer of bubbles in the thermoplastic layer. The bubbles escape through the non-skid surface when the tray is removed from the mold, causing surface imperfections in the non-skid layer that spoil the appearance of the laminate.

U.S. Pat. No. 4,163,818 to Wernli discloses an anti-slip tray and method of manufacturing thereof. The tray is comprised of alternating layers of sheets of melamine resin-impregnated papers and phenol resin-impregnated papers covered by a perforated, loosely woven cloth and a layer of porous polyvinyl chloride (PVC). All of the layers of the laminate are cured in a single molding step.

The invention of that patent is said to eliminate irregular surfaces caused by bubbles of released gas formed during curing by using upper layers of perforated cloth and a perforated PVC layer through which the gases escape during molding. Thus, that patent relies on gas escaping through perforations in the cloth and PVC layers during the molding process to avoid bubble-caused surface imperfections. The perforations of the PVC layer reportedly disappear at the end of the molding operation under the effect of the heat and pressure applied.

SUMMARY OF THE INVENTION

The present invention contemplates a method of manufacturing a non-skid laminated sheet comprising the following steps.

(a) An assembly is provided comprising, in stacked relation, (i) a core that is impregnated throughout with a thermosetting resin, (ii) a decorative sheet impregnated throughout with a thermosetting resin adjacent to and in contact with the core, and (iii) a sheet of a thermoplastic material such as polyurethane having a thickness of about 0.001 to about 0.010 inches adjacent to and covering at least a portion of the decorative sheet and opposite in the stack from the core.

(b) The assembly is releasably hot pressed and cured at a temperature of about 250° to 400° F. at a pressure of 3000 to 5000 p.s.i. to form a cured, permeable unitary first stage laminate having an irregular thermoplastic surface and containing entrapped gas formed during the cure. The hot pressing temperature utilized is sufficient to melt the thermoplastic material.

(c) The first stage laminate is maintained for a period of time sufficient for the entrapped gas formed in step (b) to permeate the laminate and be released, such as about three to about sixteen hours.

(d) The first stage laminate is thereafter hot pressed at a temperature such as about 175° to about 350° F. at a pressure such as about 250 to 750 p.s.i. and for a period of time such as about 20 seconds to about 4 minutes sufficient to soften the thermoplastic surface to form a unitary laminate with an aesthetic non-skid surface.

(e) The laminate is cooled and recovered.

Thus, the laminated sheets are manufactured at least partially in a conventional manner, but additionally contain a thermoplastic resin sheet on the surface of the laminate. The first stage laminated sheet that results from the first hot pressing step has a marred, irregular thermoplastic surface due to released gas. The first stage laminate is thereafter hot pressed at a lesser amount of heat and pressure than are necessary to cure the laminate. That additional heat pressing step softens the thermoplastic layer forming a surface with an aesthetic appearance.

The second heat and pressure step can be performed in the original mold or in a properly sized press. If desired, a textured release paper or the like can be used in this step to simultaneously emboss the thermoplastic surface.

Further, a second layer of fusibly compatible thermoplastic resin can be added over the thermoplastic layer of the first stage laminate prior to the second heat and pressure step. The second layer fuses with the first stage laminate thermoplastic surface thereby becoming a further part of the unitary laminate.

DETAILED DESCRIPTION

The method of the present invention produces a unitary laminate with an aesthetic non-skid surface. Unitary laminates are advantageous in comparison to laminates to which a non-skid surface is affixed using an adhesive. However, gas produced as the laminate cures typically causes bubbles in the non-skid layer, spoiling its appearance.

The present method addresses the problem of the formation and escape of gas formed during cure by adding a second hot pressing step after outgassing is substantially complete. The heat and pressure of that second step are sufficient to soften the unaestheticappearing thermoplastic surface to produce a laminate with an aesthetic non-skid surface.

A core imparts rigidity or support to the laminate. In preferred practice, the core is comprised of a plurality of paper sheets. Those sheets preferably are of kraft paper, uncreped or creped, or in mixtures, although cotton linters paper, and cotton or linen cloth can also be used.

The sheets making up the core generally range in individual thickness from about 0.001 to about 0.025 inches and preferably from about 0.002 to about 0.015 inches. The preferred kraft paper core sheets have a basis weight of about 30 to about 150 pounds; i.e., contain about 30 to about 150 pounds of paper per 3000 square feet. A plurality of core sheets is used in the laminates of this invention, and generally about 5 to about 30 such core sheets are used.

Laminates can also be formed from fewer than 5 core sheets. In these embodiments, rigidity can be imparted by including in the fused laminated structure a rigid preformed member such as a wood or metal sheet or ring, or a second laminate made similarly to those described herein. Additionally, the cured laminates of this invention can be affixed to a rigid member, as by gluing, after the laminate is cured. While a plurality of core sheets is used in these embodiments, as few as about 2 core sheets on up to about 30 core sheets can be used.

In yet another embodiment, the core can be a preformed unit made of wood chips or pulp, recycled newsprint, fiberglass, cotton linters or the like which adhere together sufficiently to hold a shape. When such a preform is used, it is also impregnated throughout with a thermosetting resin as is discussed hereinafter.

A decorative sheet is also used in the laminates of this invention. This paper can have a basis weight of about 20 to about 100 pounds or weigh about 20 to about 100 pounds per 3000 sq. ft. In preferred practice, this paper has a basis weight of about 50 to about 90 pounds and is usually made from alpha-cellulose.

The decorative sheet is usually printed by a technique such as offset lithography or a silk screen process in hundreds to thousands of copies per printing run. These sheets can be printed in a solid color or in a desired pattern, such as wood grain, as is known in the art. A single layer of printed, decorative sheet is normally used at each place in the laminate at which a decorative sheet is called for, and after curing, the decorative sheets are substantially opaque.

The core and decorative sheets are impregnated throughout with a thermosetting resin. The resins used herein are those commonly used in the industry for decorated laminates. These resins include melamine-formaldehyde resin, and substituted melamine-formaldehyde resins such as bezoguanamine formaldehyde resin, phenol-formaldehyde and substituted phenol resins such as cresol-formaldehyde resins, urea-formaldehyde and substituted urea-formaldehyde resins as well as phenolic rubbers, epoxy, silicone and acrylic resins.

The melamine- and substituted melamine-formaldehyde resins are termed herein melamine resins, the phenol- and substituted phenol-formaldehyde resins are termed herein phenolic resins. While above resin types can each be used for each of the core and decorative sheets, it is preferred that phenolic resins be used for the core sheets. In a most preferred embodiment, the decorative sheets are impregnated with a phenolic resin. However, a melamine resin is preferred in some applications as where a light colored product is desired. These preferences are based upon cosmetic, cost and durability factors.

When a melamine-impregnated decorative sheet is used, a clear overlay sheet can additionally be used to improve the stain resistance of the melamine-impregnated surface. An overlay sheet is preferably omitted when the decorative sheet is covered by a thermoplastic sheet that forms a non-skid layer.

The core (whether sheets or preform) and decorative sheets normally contain about 30–35 percent of their final "dry" weight of the phenolic resin that normally has about a 6–7 percent by weight volatile content and a flow of about 4–6 percent. When melamine resin-impregnated sheets are used, about 60–65 percent by "dry" weight of the sheets are attributable to the melamine resin, which has a volatile content of about 8–10 percent by weight.

Methods of applying the resins to the various laminate layers are known in the art, and will not be dealt with herein. After application of the resin, the resin is dispersed throughout the layers and they are "dried" to the volatile contents stated hereinabove. Thus, since the layers retain volatiles, they are not absolutely dry, although they appear dry and are usually not tacky or damp to the touch.

When it is humid, the sheets are preferably B-staged, partially polymerized, prior to molding. That is, the sheets are heated, either in a conventional oven or a microwave oven as is known, to eliminate excess moisture.

A thermoplastic resin film is adjacent to the decorative sheet, and covers that sheet at least in part. The thermoplastic film is opposite in the stack from the core.

The thermoplastic material can be any thermoplastic material compatible with the resins used. In a preferred embodiment the material is a thermoplastic urethane elastomer film.

Urethane elastomer films can be either polyether polyurethane or polyester polyurethane, both of which are generally well-known in the art. Polyether polyurethanes are preferred. Useful polyurethane films are available commercially from, for example, Deerfield Urethane, Inc., of South Deerfield, MA which sells a number of suitable films of several thicknesses under the trade name DUREFLEX. Further, the degree of slip, tack, "hand", gloss, and opacity of the polyurethane elastomer film can be modified by the supplier to suit a particular application.

A most preferred urethane elastomer film is the polyester polyurethane designated DUREFLEX PT 6320F. Film PT 6320F has a somewhat greater lubricant content than does the polyester polyurethane film sold under the designation DUREFLEX PT 6300, which is also suitable. However, the additional lubricant is advantageous in that it improves the ease of separating the film sheets. The other characteristics of the films are substantially the same.

Polyether polyurethanes sold under the designations DUREFLEX PT 9100 and PT 9300 have similar characteristics to those of film PT 6300. In particular, their processing temperature range and hardness are very similar as reported by the supplier. Further, the reported elongation values, tear strength values, yields and taber abrasion values are also similar.

Polyester polyurethanes, such as DUREFLEX PS3300, PS3400, and PS8600 also reportedly have similar characteristics and are suitable for use in the invention.

Specifically, physical properties of the aforementioned DUREFLEX polyurethanes (PT 6320F, PT 6300, PT 9100 and PT 9300) include a processing temperature range of 340°–460° F., a hardness range (Shore A Durometer values) of 80–95, an elongation value range of 400 to 550 percent, a tear strength value range of 300–500 lbs/in., a yield value range of 144 to 170 sq.ft./lb./mil and a taber abrasion value range of 8 to 20. DUREFLEX PT 6300 and also PT 6320F have a processing temperature range of 340°–360° F., a hardness value of 80, a 550 percent elongation value, a 420 lb./in. tear strength; a yield of 170 sq.ft./lb./mil, and a taber abrasion value of 12.

The method comprises the following steps.

(a) An assembly is provided comprising in stacked relation a core impregnated throughout with a thermosetting resin, preferably a thermosetting phenolic resin. A decorative sheet impregnated with a thermosetting resin is adjacent to and in contact with the core. The decorative sheet can be impregnated with either a melamine or phenolic resin. A sheet of a thermoplastic material such a polyurethane having a thickness of about 0.001 to about 0.010 inches is adjacent to and covering at least a portion of the decorative sheet and opposite in the stack from the decorative sheet.

(b) The aforedescribed assembly is hot pressed and cured (molded) at a temperature of about 250° to about 400° F., a pressure of about 3000 to about 5000 p.s.i. and for a time period sufficient to form a cured, permeable unitary first stage laminate having an irregular, unaesthetic looking thermoplastic surface and containing entrapped gas formed in situ during the cure.

The molding cycle preferably takes about 100 to about 200 seconds. The mold can be partially opened one to four times during the cycle to allow the release of gas formed by the condensation reaction of the phenolic resin as it is cured.

A non-stick platen in the mold can be used to releasably hot press and cure the assembly. In a preferred embodiment a non-stick release sheet at least covers the surface of the thermoplastic sheet opposite to the decorative sheet in the assembly.

The release sheet acts as a protective layer to prevent the thermoplastic sheet from sticking to the heated mold surface. The release sheet is preferably larger than the thermoplastic sheet. A release paper also can be used. A polyester film such as that of polyethylene tetraphthalate (Mylar) (Terra Corporation, New Berlin, WI) having a thickness of about 0.001 to about 0.005 inches is preferred.

During the molding process, the thermoplastic sheet melts and flows into the adjacent sheet in the stack, and may penetrate into the core sheets. By "unitary" it is meant herein that during the cure, the various layers become fused to one another so that after cure, the laminated product cannot readily be separated into its constituent layers.

The released gas formed during the hot press curing (molding) process permeates the first stage laminate and particularly the thermoplastic layer causing that layer to foam when the hot first stage laminate is removed from the mold. The presence of the gas results in a layer of bubbles between the thermoplastic film and the release sheet when a release sheet is present. When the release sheet is removed the bubbles rupture, causing an irregular, unaesthetic surface on the thermoplastic layer.

When a release sheet is used, the sheet must be removed shortly after the hot, first stage laminate is removed from the mold. The release sheet will otherwise become bonded to thermoplastic non-skid surface in a time period of about 15 seconds. When a non-stick platen is used, gas escapes through the non-skid layer causing an irregular surface.

(c) The first stage laminate is not further processed until out-gassing is substantially complete; i.e., the first-stage laminate is maintained for a period of time sufficient for entrapped gas that is formed during the hot pressing and curing step to permeate the first stage laminate and be released. This generally takes at least about three to about sixteen hours. It is generally most convenient to wait overnight, a time period of about 18 to 24 hours. While it is preferred to wait until outgassing is complete, no known problems occur by waiting several days or weeks to complete the cycle.

A second release sheet is placed over the thermoplastic surface of the out-gassed first stage laminate. This second release sheet can be of the same materials as used in steps (a) and (b). Preferably, the release sheet is a paper release sheet. Alternatively, a non-stick platen is used in step (d), below.

In applications where a smooth surface is desired, as where the non-skid surface will be in contact with objects under primarily dry conditions, a smooth release paper or a smooth non-stick platen is used during the second hot pressing step. In applications where an embossed surface is desired, as where the surface will be in contact with objects under primarily wet conditions, a textured released paper or textured platen is used. The textured release paper or textured platen both embosses the surface and helps prevent the surface from sticking to the press.

(d) Thereafter, the out-gassed first stage laminate is releasably hot pressed at a temperature, pressure and for a period of time sufficient to soften the thermoplastic surface to form a unitary laminate with an aesthetic non-skid surface, such as about 175° to about 350° F. at a pressure such as about 250 to about 750 p.s.i., and for a time period of about 20 seconds to about 4 minutes. This step can be performed in a properly-equipped press. In a preferred embodiment it is performed in a hydrolic press using a heated plate at a temperature of about 175° to about 250° F. at a pressure of about 250 to about 350 p.s.i. for a time period of about 1.5 to about 3 minutes. The temperatures refer to the temperature of the surface that contacts the laminate. If used, the release sheet is removed, and (e) the laminate is cooled and recovered. That is, the laminate is allowed to cool and is thereafter ready for use.

In another embodiment, the thermoplastic sheet is about 0.001 to about 0.005 inches thick and a second sheet of a fusibly compatible thermoplastic resin film of substantially the same size as the aforedescribed sheet and having a thickness of about 0.002 to about 0.006 inches is placed on the non-skid surface of the laminate after out-gassing is complete. Both sheets of thermoplastic material can be comprised of the same resin. In a most preferred embodiment, both sheets are comprised of a urethane elastomer film.

The assembly can be varied to suit the final application of the laminate. For example, when a countertop or like surface is desired, the non-skid surface can cover substantially all of the top surface of the laminate. The bottom surface need not be decorated, nor include a non-skid, thermoplastic surface. Therefore, the assembly can include a sheet of thermoplastic material that covers substantially all of the top surface of the assembly, and need not include a second decorative sheet.

In applications such as a serving tray, upturned edges of the tray can be left with a smooth surface not covered by the non-skid layer and the bottom of the tray preferably has a decorated surface. Therefore, a first and a second decorated sheet are placed into the aforementioned stacked assembly adjacent to, in contact with and on either side of the core. The thermoplastic sheet that covers the decorated sheet and from which the non-skid surface is formed has smaller dimensions than the core and decorated sheets to permit formation of a thermoplastic non-skid layer-free border around the tray.

The decorative sheets are preferably a solid color, wood grain, or the like. Although the non-skid surface is preferably transparent, as where a urethane elastomer is used, the thickness of the non-skid surface can distort the design of the decorative sheet somewhat.

In personalized applications, an inked design or the like can be placed directly on the non-skid layer after it is cured. A second thermoplastic layer seals in the design.

Alternatively, the inked design can be placed on the second thermoplastic sheet. The printed surface is placed adjacent to the non-skid surface of the laminate prior to the second heating step so that the printed design is sealed between the sheets after fusing.

Printed indicia can also be placed on the non-skid surface of the finished tray. Indicia applied in this manner are not protected by a thermoplastic resin layer and wear more quickly than indicia sealed between urethane layers.

A sheet of paper, photograph or like design can similarly be sealed between the layers. This is less preferred than printing directly on the thermoplastic layer because the edges of the paper remain discernible.

A most preferred embodiment of the invention contemplates a method for manufacturing a non-skid laminated tray. The tray was produced in the following manner.

Large rolls of kraft paper having a basis weight of 132 pounds were impregnated with phenolic resin using a machine that ran the paper through a tank filled with liquid resin and saturated the paper. Excess resin was removed using a wiper blade, and the impregnated paper was dried.

The impregnated paper was cut to a proper size using an in-line sheeting machine. The papers were stacked in layers of 7 to 17 sheets depending on the type of tray to be produced to form the core of the tray. Seven to 14 sheets were used to produce a "thin" tray while 11 to 17 sheets were used for a "thick"tray. A colored decorative sheet similarly impregnated with phenolic resin was placed on the top and bottom of each stack of core sheets.

A 0.002 inch thick DUREFLEX PT 6320F polyether polyurethane elastomer film was die cut to a size having dimensions approximately 0.4 inches smaller on each side than the size of the finished flat tray bottom. This elastomer film sheet was centered and placed on top of the above-prepared stack, and covered with a slightly larger 0.002 inch thick polyester (Mylar) film release sheet to form an assembly.

Alternatively, a 0.002 inch thick DUREFLEX PT 6320F film releasably laminated to a 0.002 inch thick Mylar film and die cut to a proper size was purchased from MilCut, Inc. of Milwaukee, WI. Use of that two-sheet laminate ensured that the urethane film was properly aligned under the Mylar release sheet.

The assembly was compression molded (hot pressed and cured) in a press containing a tray mold at a temperature of 330° F., at a pressure of 3800 p.s.i. for a time period of about 130 seconds. The mold was partially opened three times during the first minute of compression molding to permit the escape of gases produced as the laminate cured. Compression molding produced a cured, permeable, unitary first stage laminated tray having an irregular thermoplastic surface and containing entrapped gas. As the mold was opened, the urethane film foamed, thereby trapping bubbles between the polyester release sheet film and the urethane film. The bubbles ruptured as the polyester film was removed producing an irregular surface. The polyester film was discarded.

The tray was maintained overnight to allow the remaining gas entrapped in the laminate to escape. The excess material at the edges of the tray, the flash, was removed. The edges were sanded and buffed until they were smooth.

A 0.004 inch thick DUREFLEX PT 6320F film sheet of one eighth inch smaller diameter than the first sheet was placed on top of the urethane surface of the tray and covered with a textured release paper. The second thermoplastic sheet preferably does not extend over the edges of the first thermoplastic sheet to ensure bonding to the laminate. The covered tray was placed back into the press and remolded at a temperature of 220° F. at 260 p.s.i. for a time period of 140 seconds. The tray was removed, and the release paper was pulled off. The tray was allowed to cool. The finished tray had an embossed non-skid surface.

Larger, substantially flat sheets of a laminate of this invention are prepared similarly, using flat hot press-curing techniques as are well known.

The foregoing is intended as illustrative of the present invention but is not limiting. Numerous variations and modifications can be effected without departing from the spirit and scope of the novel concepts of the invention.

What is claimed is:

1. A method of manufacturing a non-skid laminated tray comprising the steps of:
   (a) providing an assembly comprising in stacked relation
      (i) a plurality of paper core sheets impregnated throughout with a thermosetting phenolic resin,
      (ii) first and second decorative sheets adjacent to and on either side of said core sheets, said decorative sheets being impregnated with a thermosetting phenolic resin the decoration thereon facing away from said core sheets,
      (iii) a sheet of a thermoplastic urethane elastomer film that melts at a temperature and pressure sufficient to cure said thermosetting resin in said assembly and having a thickness of about 0.001 to 0.005 inches adjacent to and covering at least a portion of one of said decorative sheets, and
      (iv) a polyester film having a thickness of about 0.001 to about 0.004 inches at least covering the surface of said urethane film and opposite to said decorative sheet;
   (b) hot pressing said assembly in a mold, at a temperature of about 250° to about 400° F. at a pressure of about 3000 to about 5000 p.s.i. for a time period of about 100 to about 200 seconds during which time said mold is partially opened a plurality of times to form a cured, permeable unitary, first stage laminated tray having an irregular thermoplastic surface and containing entrapped gas;

(c) removing said polyester film;

(d) maintaining said first stage laminate for a time period of at least about 3 hours to allow entrapped gas formed in step (b) to permeate said laminate and be released;

(e) placing a second sheet of a thermoplastic urethane elastomer fim having a thickness of about 0.002 to about 0.006 inches on the thermoplastic surface of said first stage laminate;

(f) placing a textured release paper over said urethane film-covered first stage laminate;

(g) thereafter hot pressing said release paper and urethane sheet covered first stage laminate at a temperature of about 175° to about 350° F. and a pressure of about 250 to about 750 p.s.i. for a time period of about 20 seconds to about 4 minutes to form a non-skid laminate with an emobssed surface;

(h) removing said release paper;

(i) cooling and recovering said non-skid laminated tray.

2. A method of manufacturing a non-skid laminated sheet comprising the steps of:

(a) providing an assembly comprising, in stacked relation:
  (i) a core impregnated throughout with a thermosetting resin,
  (ii) a decorative sheet adjacent to said core, said decorative sheet being impregnated throughout with a thermosetting resin, and
  (iii) a sheet of a thermoplastic material that melts at a temperature and pressure sufficient to cure said thermosetting resin in said assembly and having a thickness of about 0.001 to 0.010 inches adjacent to and covering at least a portion of said decorative sheet, and opposite in said stack from said core;

(b) releasably hot pressing said assembly at a temperature of about 250° to 400° F. at a pressure of 3000 to 5000 p.s.i. to form a cured, permeable unitary first stage laminate having an irregular thermoplastic surface and containing entrapped gas;

(c) maintaining said first stage laminate for a period of time sufficient for entrapped gas formed in step (b) to permeate said laminate and be released;

(d) thereafter releasably hot pressing said first stage laminate at a temperature, a pressure, and for a period of time sufficient to soften said thermoplastic surface to form a unitary laminate with an aesthetic non-skid surface; and (e) cooling and recovering said laminate.

3. The method according to claim 2 wherein said core is impregnated with a thermosetting phenolic resin.

4. The method according to claim 2 wherein said decorative sheet is impregnated with a thermosetting phenolic resin.

5. The method according to claim 2 wherein said decorative sheet is impregnated with a thermosetting melamine resin.

6. The method according to claim 2 wherein said thermoplastic sheet is a urethane elastomer film.

7. The method according to claim 2 wherein said core comprises a plurality of paper sheets.

8. The method according to claim 2 wherein said thermoplastic sheet is about 0.001 to 0.005 inches thick and a second fusibly compatible thermoplastic sheet of substantially the same size as said first sheet and having a thickness of about 0.002 to about 0.006 inches is placed on the non-skid surface of the laminate after step (c) and before step (d).

9. The method of claim 2 wherein said hot pressing of step (d) is at a temperature of about 175° to about 350° F. and a pressure of about 250 to about 750 p.s.i. for a time period of about 20 seconds to about 4 minutes.

10. The method according to claim 9 wherein said thermoplastic material is comprised of a urethane elastomer film.

11. The method according to claim 10 wherein step (d) is performed in a mold at about 175° to about 275° F. for a time period of about 1.5 to 3 minutes.

12. The method according to claim 2 wherein said assembly of step (a) additionally includes a second decorative sheet impregnated throughout with a thermosetting resin adjacent to said core sheets on the opposite side of the assembly from said first decorative sheet.

13. The method according to claim 2 wherein step (b) is performed in a mold, for a time period of about 100 to about 200 seconds during which time period said mold is partially opened one to four times.

* * * * *